(12) United States Patent
Hussain et al.

(10) Patent No.: US 6,351,644 B1
(45) Date of Patent: Feb. 26, 2002

(54) SYSTEM, METHOD AND APPARATUS TO PREPARE BASE TRANSCEIVER STATION FOR INTRA-CELL ASYNCHRONOUS POSITIONING HANDOVER

(75) Inventors: Tahir Hussain, Kista (SE); Bagher Zadeh, Dallas; Shahrokh Amirijoo, Richardson, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/398,666

(22) Filed: Sep. 17, 1999

Related U.S. Application Data
(60) Provisional application No. 60/103,305, filed on Oct. 6, 1998.

(51) Int. Cl.[7] ................................................ H04Q 7/20
(52) U.S. Cl. ..................... 455/456; 342/357.1; 342/450
(58) Field of Search ................................ 455/456, 436, 455/517, 437, 438, 439, 440; 342/357.09, 357.1, 450, 457

(56) References Cited

U.S. PATENT DOCUMENTS

| | | | | | |
|---|---|---|---|---|---|
| 6,122,512 | A | * | 9/2000 | Bodin | 455/456 |
| 6,138,003 | A | * | 10/2000 | Kingdon et al. | 455/456 |
| 6,259,923 | B1 | * | 7/2001 | Lim et al. | 455/456 |

* cited by examiner

*Primary Examiner*—Lee Nguyen
(74) *Attorney, Agent, or Firm*—Jenkens & Gilchrist, P.C.

(57) ABSTRACT

A system, method, and apparatus for determining a position of a mobile station in a mobile telecommunications network is disclosed. Speech interruptions during mobile station positioning are reduced or eliminated by controlling the number of access bursts transmitted by the mobile station. The number of access burst transmitted by the mobile station is controlled to a level commensurate with the degree of positioning accuracy required by the requesting application. The number of access bursts is calculated by the Mobile Location Center (MLC) and communicated to the Base Transceiver Station (BTS) via the Base Station Controller (BSC). After the requisite number of access bursts are received, the BTS transmits a signal to the mobile station, causing the mobile station to cease transmitting access bursts.

13 Claims, 3 Drawing Sheets

SYSTEM, METHOD AND APPARATUS TO PREPARE BASE TRANSCEIVER STATION FOR INTRA-CELL ASYNCHRONOUS POSITIONING HANDOVER

This nonprovisional application claims priority based upon the following prior U.S. Provisional Patent Application: Ser. No. 60/103,305, filing date Oct. 6, 1998.

BACKGROUND OF THE INVENTION

1. Technical Field of the Invention

The present invention relates, in general, to the mobile communications field and, particularly, to methods for determining the location of a mobile station within a wireless network.

2. Background and Objects of the Invention

Mobile radio position determination is an emerging field that has gained a great deal of interest lately, and it is now desirable to include a position determination capability in future cellular mobile radio systems. The Time Difference of Arrival (TDOA) position determination method, which is known from military applications, has been used successfully for determining the position of mobile radio terminals. A typical TDOA position determination system can be either terminal based, whereby Time Of Arrival (TOA) measurements are made on the "downlink" in the mobile station (MS), or network based, whereby the network performs the TOA measurements on the "uplink" in the radio base transceiver stations (BTSs). These TOA measurements are then used to calculate TDOA parameters and estimate the position of the mobile station (MS).

In order to determine the position of a mobile station, a handover procedure is initiated. The mobile station transmits access request signals to a new base transceiver station. The base transceiver station measures the time delay for the access request signal to travel between the mobile station and the base transceiver station. This procedure is repeated between the mobile station and one or more additional base transceiver stations. A service node in the cellular network calculates the position of the mobile station by utilizing information about the known positions of the base transceiver stations and the measured access time delays.

This network-based method of determining the position of cellular mobile stations relies on so-called asynchronous handovers, where the target base transceiver stations measure the access delays to the mobile station. Each access delay is used as a measure of the distance between the mobile station and the respective base transceiver station. In specific situations, i.e., MS positioning, a number of BSs may concurrently tune to the same transmitting MS in order to make time delay of arrival measurements between the MS and the BSs. The time delay of the signal transmitted by the mobile station during a handover procedure may be measured by the BSs for use by a processing unit to determine the position of the mobile station. The mobile station transmits signals during the handover operation as a series of bursts.

While the MS transmits the access burst, however, the MS is unable to transmit voice signals on a traffic channel. Therefore, an undesirable speech interruption results for the duration of the MS's internal counter, e.g., for 320 milliseconds. However, access bursts for the entire 320 milliseconds are not always necessary to position the MS with an acceptable degree of precision. For example, a positioning request by an Emergency Service Bureau generally requires a high degree of precision while an application which detects home zone calls requires a lower degree of precision. Nevertheless, because the BTS does not send physical information to the MS, the MS continues to send access bursts during the 320 milliseconds until the internal counter expires even in situations where the target BTS does not require 320 milliseconds of access bursts to achieve the requisite degree of accuracy in measuring the distance between the BTS and the MS. Therefore, the positioning process results in unnecessary speech interruptions. Accordingly, there is a need to minimize undesirable speech interruptions by controlling the number of access bursts in accordance with the requisite degree of accuracy required.

SUMMARY OF THE INVENTION

The present invention is directed to a system, method, and apparatus for controlling access bursts from a mobile station during mobile station positioning to a level commensurate with the degree of precision required for the positioning. The mobile station transmits access bursts which are used to determine the distance of the mobile station from a particular point. When the distance of the mobile station from the particular point is determined within a degree of precision, which correlates to the degree of precision required for the positioning, a signal is transmitted to the mobile station which causes the mobile station to cease transmitting the speech-overriding access bursts. By controlling the duration of access burst transmissions to a level commensurate with the degree of precision required for positioning, deleterious speech interruptions during a positioning handover are reduced or eliminated.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
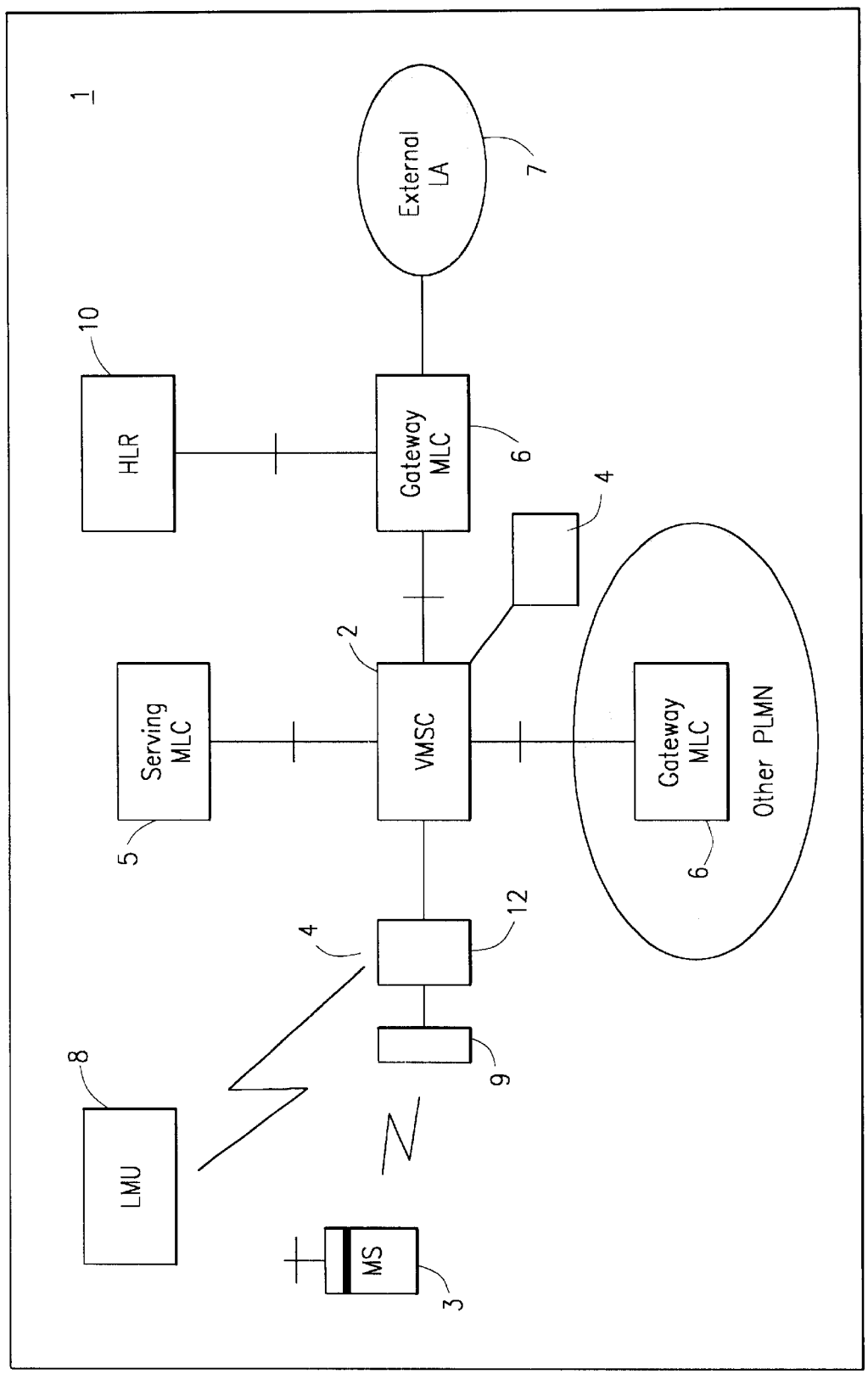
FIG. 1 is a block diagram of a mobile telecommunications system according to the present invention.

Referring to FIG. 1, there is disclosed a mobile telecommunications network 1 according to the present invention. Telecommunications network 1 preferably includes one or more mobile switching centers (MSC) 2 which provides call set-up, routing, control and termination operations in providing telecommunication services to one or more mobile stations 3. The communicative relationship between a base station 4, and particularly base station controller 12, and its corresponding MSC 2 in providing conventional telecommunication services is well known in the art. The MSC 2 may be utilized by a visiting mobile station (MS) 3 as a visiting mobile switching center (VMSC) for receiving telecommunication services.

It is understood that telecommunications network 1 may include a plurality of MSCs 2, each of which communicates with a plurality of base stations 4. Telecommunications network 1 is illustrated in FIG. 1 as having a single MSC 2 for reasons of simplicity.

Telecommunications network 1 preferably further includes a distinct mobile location center (MLC) 5 associated with each MSC 2 in telecommunication network 1. The MLCs 5 are nodes which manage the overall coordination and scheduling of resources within telecommunications network 1 to perform mobile station positioning determinations, as explained below. An MLC 5 in telecommunications network 1 may serve as a gateway mobile location center (GMLC) 6 which an external location area (LA) 7 may access in requesting a determination of a mobile station position. An MLC 5 serving mobile station 3 is referred to as the serving mobile location center (SMLC).

The present telecommunications network 1 preferably further includes a location measurement unit (LMU) 8, a distinct one of which is associated with each base transceiver station (BTS) 9. An LMU 8 preferably communicates with its corresponding base station 4 via the air interface so as to be capable of communicating with MSC 2 and MLC 5. An LMU 8 preferably has its own subscription profile in home location register (HLR) 10 associated with MSC 2. Each LMU 8 performs timing-related, radio signal measurements to support the mobile station position determination feature. The timing-related signal measurements are preferably provided to the particular MLC 5 associated therewith for facilitating MLC 5 in managing the execution of a mobile station position determination, as explained below.

Figure 2:
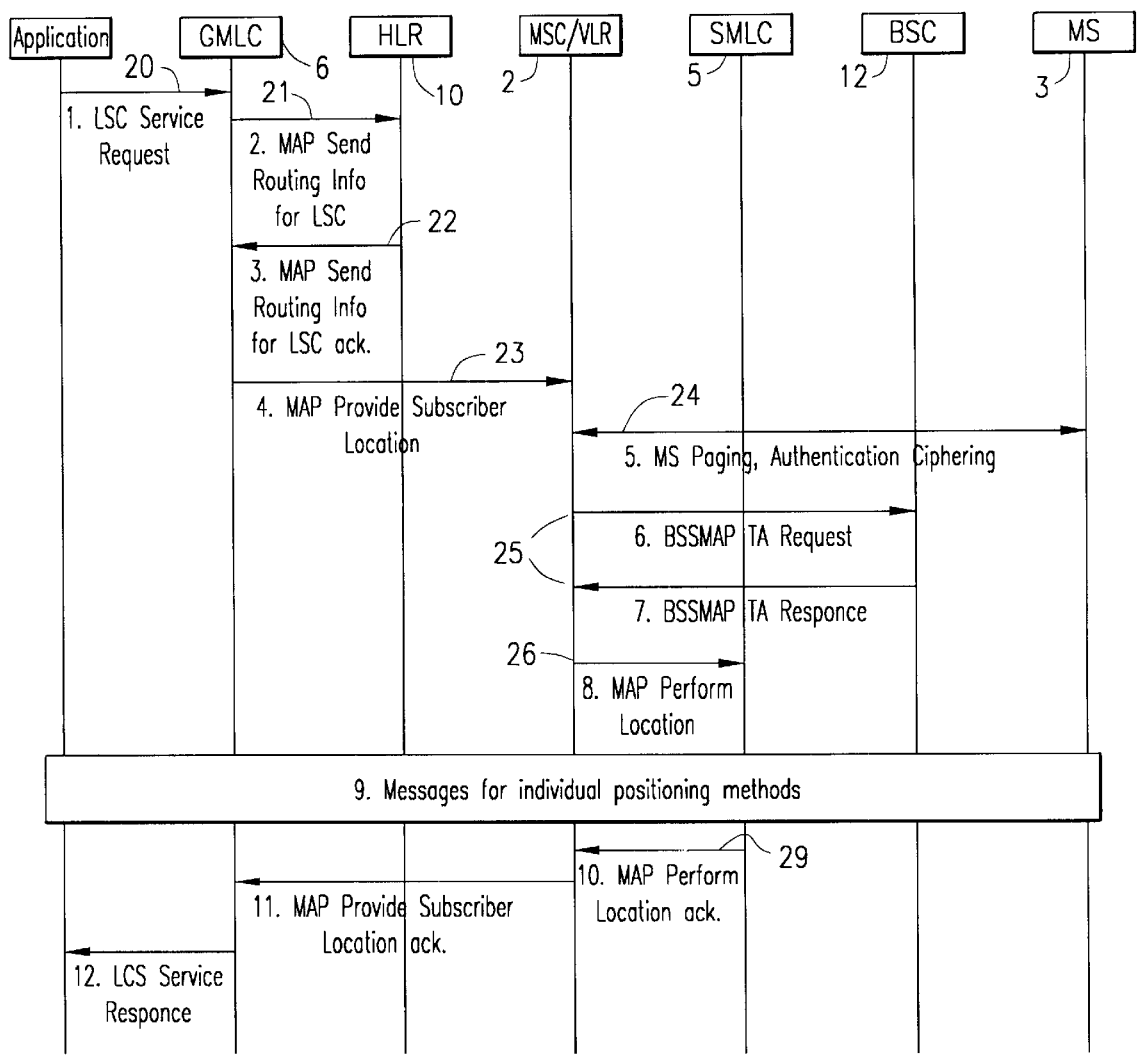
FIG. 2 is an event chronology of a mobile station positioning operation in conjunction with the present invention.

The method of determining a position of a mobile station within telecommunications network 1 will be described with reference to FIGS. 2 and 3. Initially, an application requests a mobile station position determination from a GMLC 6 (step 20) As discussed hereinbefore, the degree of positioning accuracy required varies, depending on the requesting application. The application indicates the requisite degree of accuracy as a service related parameter within the request during step 20. GMLC 6 responds to the request by verifying the identity of the application and that the application is a subscriber to the mobile station position service. Upon proper application verification and, assuming that the international mobile subscriber identity (IMSI) and the MSC 2 serving the mobile station 3 to be located are not known, GMLC 6 sends a request for routing information to the HLR 10 serving mobile station 3 at step 21. In response thereto, HLR 10 returns the address of the serving MSC 2 and the IMSI for mobile station 3 at step 22.

Upon receiving the address of the serving MSC 2, GMLC 6 sends a message to the serving MSC 2 at step 23 which informs MSC 2 of the position request. The message includes service related parameters specified by the requesting application, including the requisite degree of accuracy, response time, preferred/required positioning method and an indication whether the application has an override capability. Upon receiving the message from GMLC 6, the serving MSC 2 may verify that mobile station 3 does not bar a position determining service thereon by MSC 2 accessing the subscriber's profile. If a position determining service is barred by mobile station 3 but the requesting application possesses an override capability or if the service is not barred, the mobile station positioning determination continues by the serving MSC 2 and/or corresponding VLR (not shown) performing paging, authentication and ciphering to mobile station 3 if mobile station 3 is idle (step 24). In response thereto, mobile station 3 provides its current cell identification and timing advance (TA) value. Alternatively, if mobile station 3 is in a dedicated mode, the serving MSC 2 is supplied with the current cell identification from either BSC 12 or another MSC 2 in the event an MSC-MSC handover is in progress (step 25).

The serving MSC 2 then sends a request message to perform a location determination to the serving MLC 5 associated with the current cell of mobile station 3 (step 26). The request may include the service related parameters (including the requisite degree of accuracy) specified by the requesting application as well as the current cell identification and TA value of mobile station 3.

Figure 3:
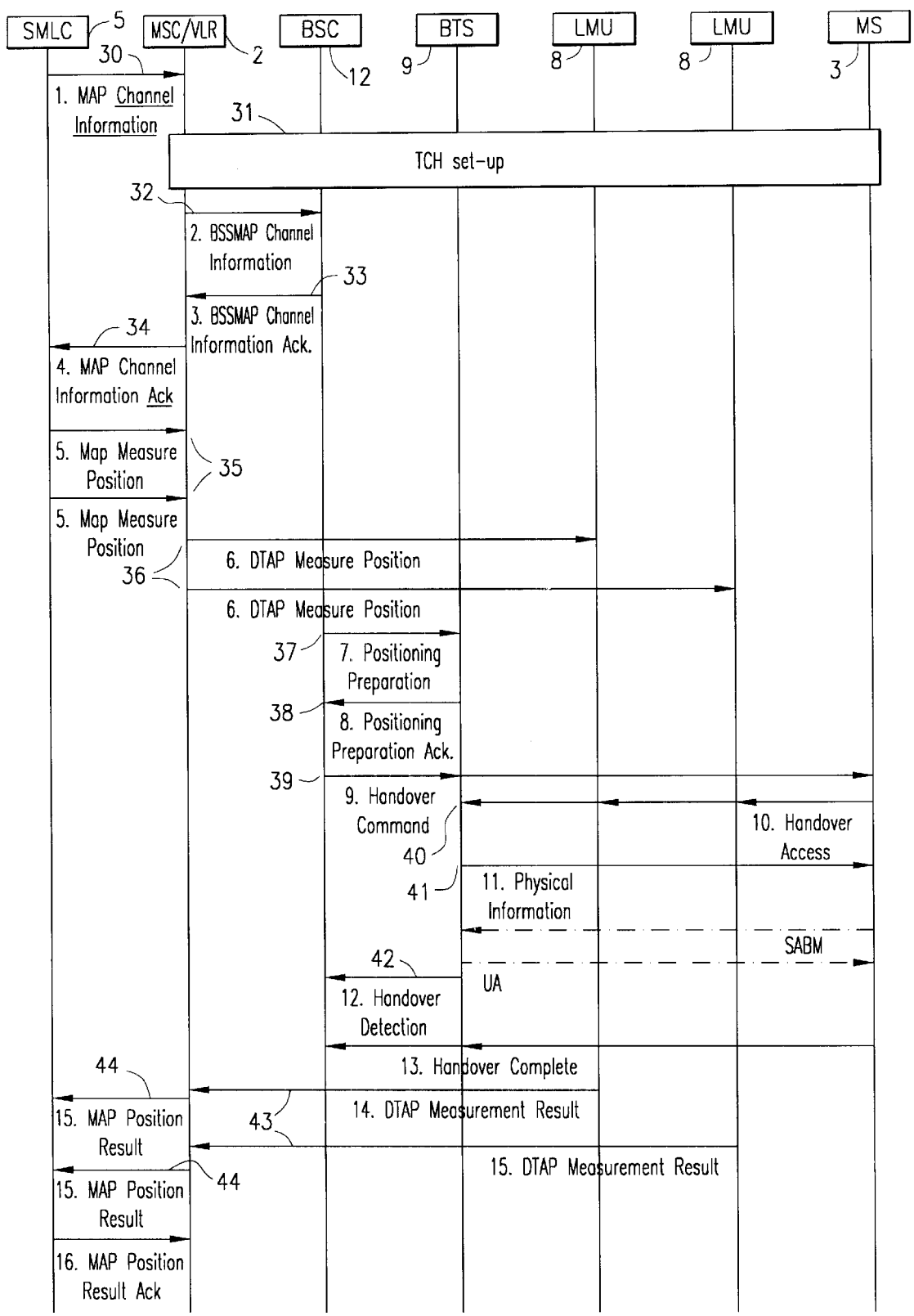
FIG. 3 is an event chronology of the TOA-based positioning procedure for executing a mobile station positioning operation in conjunction with the present invention.

Referring now to FIG. 3, upon receiving the request message to perform the position determination for mobile station 3, the serving MLC 5 calculates the number of access burst transmissions required by mobile station 3, and calculates a timer value for base station(s) 4. The serving MLC 5 additionally determines the TDMA frame number. The serving MLC 5 performs the calculations and determinations based upon the number of available LMUs 8 and the requisite degree of accuracy (signal 26) received from the MSC 2.

Next, the serving MLC 5 then transmits a channel information message to the serving MSC 2 (and any other MSC 2 which is necessary to perform the position determination) at step 30 having therein the required number of burst signals, the determined TDMA frame number, the base station controller timer value and an indication that TOA positioning will be utilized. In response thereto, a traffic channel is set up in the event mobile station 3 is idle (step 31).

Next, MSC 2 transmits a channel information message to the appropriate BSC(s) 12, requesting the physical channel description of the allocated traffic channel (step 32). The channel information message may also contain the determined TDMA frame number, the number of expected mobile station access bursts and the calculated base station timer value. The BSCs 12 initiate a base station timer (not shown) at this time. In response to receiving the channel information message from MSC 2, the BSCs 12 specify the physical channel description, the CGI, and TA measurement result, and transmits an acknowledgment message to MSC 2 at step 33. Subsequent thereto, MSC 2 transmits a channel information acknowledgment message to the serving MLC 5 having therein the physical channel description (step 34). The serving MLC 5 uses the physical channel information in configuring LMUs 8.

The MLC 5 then transmits a measurement configuration messages for each of the LMUs 8 to MSC 2 (step 35). The configuration message specifies the physical channel, LMU identification, TDMA frame number for the handover operation portion of the position determining service, the number of expected access bursts by mobile station 3, and the starting time and measurement window for the expected access bursts. In response thereto and assuming a DTAP connection is already established, MSC 2 converts the configuration message from the serving MLC 5 into a DTAP message for reception by the identified LMUs 8 over the air interface (step 36).

Upon expiration of the base station controller timer, the base station controller sends a positioning preparation message to the serving BTS 9 (step 37). This message defines the time period corresponding to the required number of access bursts. The serving BTS 9 responds by transmitting a positioning preparation acknowledgment signal to the respective BSC 12 (step 38).

Thereafter, base station controller 12 sends a handover command to mobile station 3 at step 39. The command includes the TDMA frame number at which the transmission of access bursts should begin. Mobile station 3 commences transmitting access bursts in a handover access message at step 40. The involved LMUs 8, already configured for receiving the burst signal transmission, measure the time of arrival thereof.

When the time period provided by the positioning preparation message (during step 37) expires, the BTS 9 corresponding thereto sends a physical information message to mobile station 3 at step 41, thereby causing the mobile station 3 to discontinue transmitting access burst signals. It is noted that in the event mobile station 3 fails to receive a request to discontinue the burst transmission, a timeout condition occurs which discontinues the transmission. Next, the BTS 9 transmits a handover detection message to the BSC 12 to indicate that the required number of access bursts have been received on the allocated channel (step 42). Mobile station 3 sends a handover complete message to the BSC 12. This triggers base station controller 12 to switch paths from the old channel to the new channel. However, it is noted that in the mobile station positioning determination feature, the old channel may be the same as the new channel when executing the handover command thereof.

Next, LMUs 8 report their timing measurement results in a DTAP message to MSC 2 (step 43), which is thereupon routed to the serving MLC 5 as a MAP message (step 44). At this point, the serving MLC 5 computes a position for mobile station 3 based upon the reported measurement results.

Referring again to FIG. 2, once the serving MLC 5 computes the position for mobile station 3, the serving MLC 5 transmits a MAP perform location acknowledge signal to MSC 2 (step 29). In response thereto, MSC 2 forwards the position information to the GMLC 6, whereupon the position information is forwarded to the requesting application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for determining the location of a mobile station in a wireless telecommunications system within a predetermined degree of precision, said method comprising the steps of:

commanding, from a first node in said wireless telecommunications system, the mobile station to commence transmitting access bursts;

receiving, by at least one second node in said wireless telecommunications system, a given number of access bursts from said mobile station, where said access bursts determine the location of said mobile station within said predetermined degree of precision; and transmitting, from said first node, responsive to receiving said given number of access bursts, a cessation signal to the mobile station to cease transmitting said access bursts.

2. The method according to claim 1, further comprising the step of:

determining a time period associated with said given number of access bursts.

3. The method according to claim 2, wherein said step of transmitting further comprises the step of:

transmitting said cessation signal responsive to the expiration of said time period.

4. The method according to claim 1, wherein said step of transmitting further comprises the step of:

transmitting the cessation signal from a base transceiver station.

5. The method according to claim 1, wherein said step of transmitting further comprises the step of:

transmitting physical information to the mobile station, said physical information causing the mobile station to cease transmitting the access bursts.

6. The method according to claim 1, wherein, in said step of commanding, said first node comprises a base station controller.

7. The method according to claim 1, wherein, in said step of receiving, said at least one second node comprises at least one location measurement unit.

8. The method according to claim 7, wherein said at least one second node comprises a plurality of location measurement units.

9. A mobile telecommunications network for determining a location associated with a mobile station within a predetermined degree of precision, said mobile telecommunications network comprising:

a mobile location center (MLC), for calculating a given number of access bursts to determine the location of said mobile station within said predetermined degree;

a base station controller for commanding said mobile station to commence transmitting said given number of access bursts;

a plurality of location measurement units (LMUs) for receiving said given number of access bursts; and a base transceiver station for transmitting a cessation signal to said mobile station, causing said mobile station to cease transmitting said access bursts, responsive to said plurality of location measurement units receiving said given number of access bursts.

10. The mobile telecommunications network according to of claim 9, wherein said mobile location center determines a given time associated with said given number of access bursts.

11. The mobile telecommunications network of claim 9, wherein said base transceiver station transmits physical information responsive to said plurality of location measurement units receiving said given number of access bursts.

12. A base transceiver station in a wireless telecommunications system for determining a position for a mobile station, said base transceiver station comprising:

a receiver for receiving a signal indicating a given period of time, said given period of time corresponding to the time for receiving a given number of access bursts from said mobile station; and a transmitter for transmitting a cessation signal to said mobile station after said given period of time expires, whereby the position of said mobile station is determined by said access bursts.

13. The base transceiver station according to claim 12, wherein said cessation signal comprises physical information.

* * * * *